(12) United States Patent
Breen

(10) Patent No.: US 10,611,247 B1
(45) Date of Patent: Apr. 7, 2020

(54) POWER GENERATION SYSTEM FOR PHYSICALLY-COUPLED VEHICLES AND METHOD OF OPERATION THEREOF

(71) Applicant: AK Motorcars Inc., East Northport, NY (US)

(72) Inventor: Eric Breen, Northport, NY (US)

(73) Assignee: AK Motorcars Inc., East Northport, NY (US)

( * ) Notice: Subject to any disclaimer, the term of this patent is extended or adjusted under 35 U.S.C. 154(b) by 0 days.

(21) Appl. No.: 16/381,572

(22) Filed: Apr. 11, 2019

(51) Int. Cl.
| | |
|---|---|
| *B60L 7/10* | (2006.01) |
| *B60D 1/167* | (2006.01) |
| *B60L 50/60* | (2019.01) |
| *B60L 58/12* | (2019.01) |
| *H02J 7/14* | (2006.01) |

(52) U.S. Cl.
CPC .............. *B60L 7/10* (2013.01); *B60D 1/1675* (2013.01); *B60L 50/60* (2019.02); *B60L 58/12* (2019.02); *H02J 7/1423* (2013.01); *B60L 2220/44* (2013.01); *B60Y 2200/91* (2013.01); *B60Y 2300/18125* (2013.01); *B60Y 2300/91* (2013.01)

(58) Field of Classification Search
CPC .. B60L 7/10; B60L 50/60; B60L 58/12; B60L 2220/44; B60D 1/1675; B60D 1/00; B60D 1/155; B60D 1/167; B60D 1/54; B60D 1/07; B60Y 2200/91; B60Y 2300/18125; B60Y 2300/91; H02J 7/1423; A01D 78/00; A01D 8/08; A01D 78/08

See application file for complete search history.

(56) References Cited

U.S. PATENT DOCUMENTS

| | | | |
|---|---|---|---|
| 2,179,070 A | 11/1939 | Weise | |
| 3,032,353 A | 5/1962 | Williams | |

(Continued)

FOREIGN PATENT DOCUMENTS

| | | |
|---|---|---|
| CN | 205010192 U | 2/2016 |
| EP | 0089614 A | 9/1983 |
| GB | 2217281 A | 10/1989 |

OTHER PUBLICATIONS

Kamachi et al., Development of power management system for electric vehicle "i-MiEV", 2010, IEEE, p. 2949-2955 (Year: 2010).*

(Continued)

*Primary Examiner* — McDieunel Marc
(74) *Attorney, Agent, or Firm* — Sorell, Lenna & Schmidt, LLP

(57) ABSTRACT

A system for coupling a towing vehicle to a towed vehicle and/or for controlling charging/braking by the towed vehicle. The system may include a coupler coupling to the towing vehicle; and first and second tow bars having first and second ends and a rotational joint situated between the first and second ends, the first and second tow bars coupled to the coupler at the first ends and being non-parallel in at least one plane with the second ends located further apart from each other than the first ends. The rotational joint providing for the first and second tow bars to be positioned in an open and a folded position. The second ends of the first and second tow bars are configured to be coupled to the towed vehicle. For charging, a trip distance and charge of a towed vehicle battery is utilized to determine a charging rate for the trip.

7 Claims, 8 Drawing Sheets

(56) References Cited

U.S. PATENT DOCUMENTS

| | | | |
|---|---|---|---|
| 4,186,938 A | | 2/1980 | Youngblood |
| 5,346,243 A | * | 9/1994 | Boeck .................... B60D 1/167 |
| | | | 280/478.1 |
| 6,332,626 B1 | * | 12/2001 | Morrill .................... B60D 1/07 |
| | | | 280/491.3 |
| 7,510,204 B2 | | 3/2009 | Inoue et al. |
| 8,056,919 B1 | | 11/2011 | Huston et al. |
| 8,066,299 B2 | | 11/2011 | Olsen |
| 9,259,983 B2 | | 2/2016 | Hohlrieder |
| 2003/0233820 A1 | * | 12/2003 | Menichetti ............. A01D 78/08 |
| | | | 56/377 |

OTHER PUBLICATIONS

Bish et al., Electric vehicle field test experience, 1983, IEEE, p. 81-89 (Year: 1983).*

Xu et al., Investigation of configuration and control strategy for range extended electric vehicle, 2015, IEEE, p. 1399-1404 (Year: 2015).*

Yu et al., Parametric design of power-split HEV drive train, IEEE, p. 2009, IEEE, p. 1058-1063 (Year: 2009).*

* cited by examiner

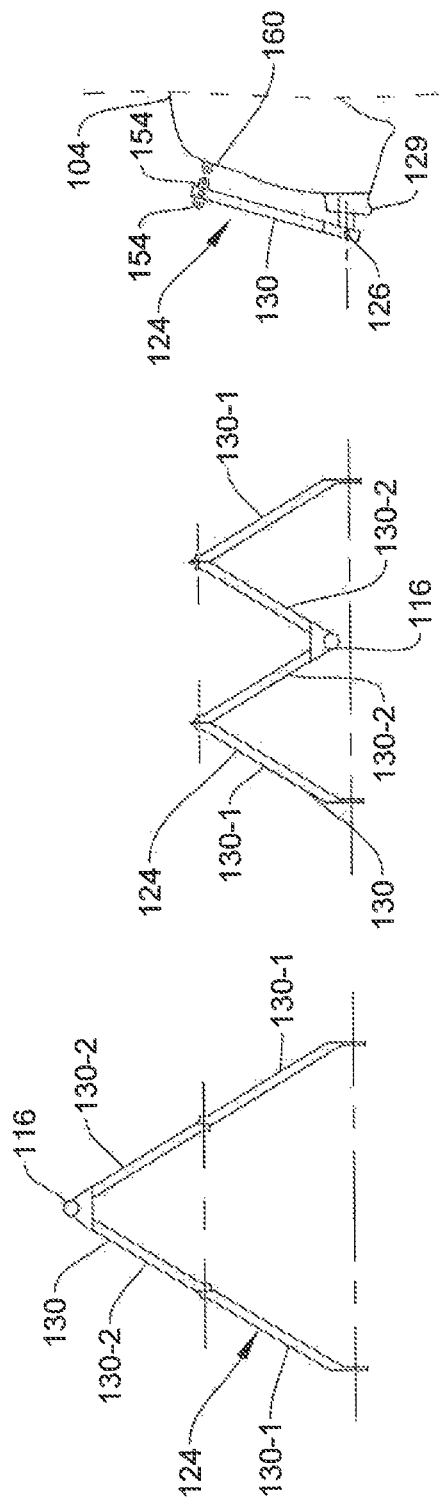

POWER GENERATION SYSTEM FOR PHYSICALLY-COUPLED VEHICLES AND METHOD OF OPERATION THEREOF

FIELD OF THE PRESENT SYSTEM

The present system relates to a power generation system for physically-coupled vehicles such as tractor-trailer combinations and the like and, more particularly, to a power generation system and coupling system for tractor-trailer and/or recreational type vehicles which provides for power generation and storage during a towing operation, and methods of operation thereof.

BACKGROUND OF THE PRESENT SYSTEM

Typically, self-motorized recreational vehicles (hereinafter RVs) such as motorhomes, campervans, truck camper (TC) and the like, may provide for transport, living, and sleeping accommodation. Accordingly, RVs may include a kitchen or galley, living and sleeping areas as well as a lavatory. Further, the RV may include electronically-powered appliances such as water heaters, washing machines, dryers, ovens, microwave ovens, refrigerators, televisions, air-conditioners, and the like. RVs may include a trailer hitch for towing a vehicle such as an automobile attached thereto. When parked, the automobile may then be detached from the RV and used for transportation while the RV may remain parked in a desired area such as at a campsite. To power electronically-powered appliances, the RV may include an internally-stored electrical power source such as batteries, and/or a generator to provide power to the RV when mains power may not be desired or available. Unfortunately, the internally-carried power source may take valuable space and increase weight of the mobile home. Further, generators consume fuel, are noisy and need to be running to provide power to the RV. Accordingly, embodiments of the present system may overcome these and other disadvantages of conventional systems and methods.

SUMMARY OF THE PRESENT SYSTEM

The system(s), device(s), method(s), arrangements(s), user interface(s), computer program(s), processes, etc. (hereinafter each of which will be referred to as system, unless the context indicates otherwise), described herein address problems in prior art systems. Embodiments of the present system may provide a system and method for coupling a towing vehicle to a towed vehicle and/or for controlling charging and/or braking provided by the towed vehicle.

In accordance with embodiments of the present system, there is disclosed a system for coupling a towing vehicle to a towed vehicle. The system may include a coupler configured to be coupled to the towing vehicle; and first and second tow bars having first and second ends and a rotational joint situated between the first and second ends, the first and second tow bars coupled to the coupler at the first ends and being non-parallel to each other in at least one plane such that the second ends are located further apart from each other than the first ends. The rotational joint may include a first rotational joint on the first tow bar and a second rotational joint on the second tow bar, the rotational joint being configured to provide for the first and second tow bars to be positioned in an open and a folded position. The second ends of the first and second tow bars are configured to be coupled to the towed vehicle.

In accordance with embodiments, the first and second tow bars may substantially form an "A" like shape when in the open position and an "M" like shape when in the folded position. The rotational joint may define an axis of rotation which extends through the first and second tow bars. The first and second rotational joints may each define a substantially common axis of rotation. At least one of the first and second tow bars may further include a rotational lock to lock the corresponding tow bar of the first and second tow bars in an open position suitable for towing the towed vehicle. The rotational lock may include a plurality of flanges each having an opening, wherein the openings of adjacent flanges may be aligned with each other when the first and second tow bars are in the open position. At least one of the first and second tow bars may further include a rotational lock to lock a corresponding tow bar of the first and second tow bars in the folded position against the towed vehicle.

In accordance with embodiments of the present system, an electric vehicle may include at least one traction motor configured to provide a motive force to rotate at least one wheel of the electric vehicle to propel the electric wheeled vehicle; at least one battery pack comprising a plurality of battery cells and configured to power the at least one traction motor; and at least one controller circuit configured to: determine trip distance information (TDI) corresponding to a predetermined distance to be travelled by the electric vehicle when under tow by another vehicle, determine charge amount information (CAI) for the battery pack based upon a capacity of the battery pack and a current charge of the battery pack, determine rate of charge information (RCI) to be generated by the at least one traction motor in accordance with the TDI and CAI, the RCI determining a rate of charge of the at least one battery pack over the predetermined distance, and control charging of the at least one battery pack in accordance with the RCI.

In accordance with embodiments, the at least one traction motor may be situated in a hub of at least one wheel of the electric vehicle. The electric vehicle may further include a foldable tow bar assembly configured to be coupled to the other vehicle when in an open position and stored for travel by the electric vehicle independently of the other vehicle when in a folded position. The foldable tow bar assembly may be configured to substantially form an "A" like shape when in the open position and an "M" like shape when in the folded position. The at least one controller circuit may control a charger of the electric vehicle to charge the at least one battery pack substantially equally over the predetermined distance. The RCI may be determined such that the battery pack is charged substantially at an equal rate by distance over the predetermined distance. The at least one controller circuit may be configured to control the at least one traction motor to substantially run in a regenerative mode to generate power to charge the at least one battery equally over the predetermined distance when the electric vehicle is towed by the other vehicle.

In accordance with embodiments, a control system for an electric wheeled vehicle may include a non-transitory memory including controller readable instructions; and at least one controller coupled to the memory. When the controller executes the controller readable instructions, the controller may be configured to: determine trip distance information (TDI) corresponding to a predetermined distance to be travelled by the electric wheeled vehicle when under tow by an other vehicle, determine charge amount information (CAI) for a battery pack of the electric wheeled vehicle based upon a capacity of the battery pack and a current charge of the battery pack, determine rate of charge information (RCI) to be generated by at least one traction motor of the electric wheeled vehicle in accordance with the TDI and CAI, the RCI determining a rate of charge of the at least one battery pack over the predetermined distance, and control charging of the at least one battery pack in accordance with the RCI. The at least one controller may be further configured to charge the battery pack substantially uniformly over the predetermined distance.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. In the drawings:

FIG. 4 shows a top view of a portion of a tow bar assembly in an extended position in accordance with embodiments of the present system;

FIG. 5 shows a top view of a portion of a tow bar assembly in a folded position in accordance with embodiments of the present system;

FIG. 6 shows a side view of a portion of a tow bar assembly offset from a folded storing position in accordance with embodiments of the present system;

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques, and methods are omitted so as not to obscure the description of the present system. It should be expressly understood that the drawings are included for illustrative purposes and do not represent the entire scope of the present system. In the accompanying drawings, like reference numbers in different drawings may designate similar elements. The term and/or and formatives thereof should be understood to mean that only one or more of the recited elements may need to be suitably present (e.g., only one recited element is present, two of the recited elements may be present, etc., up to all of the recited elements may be present) in a system in accordance with the claims recitation and in accordance with one or more embodiments of the present system.

Figure 1:
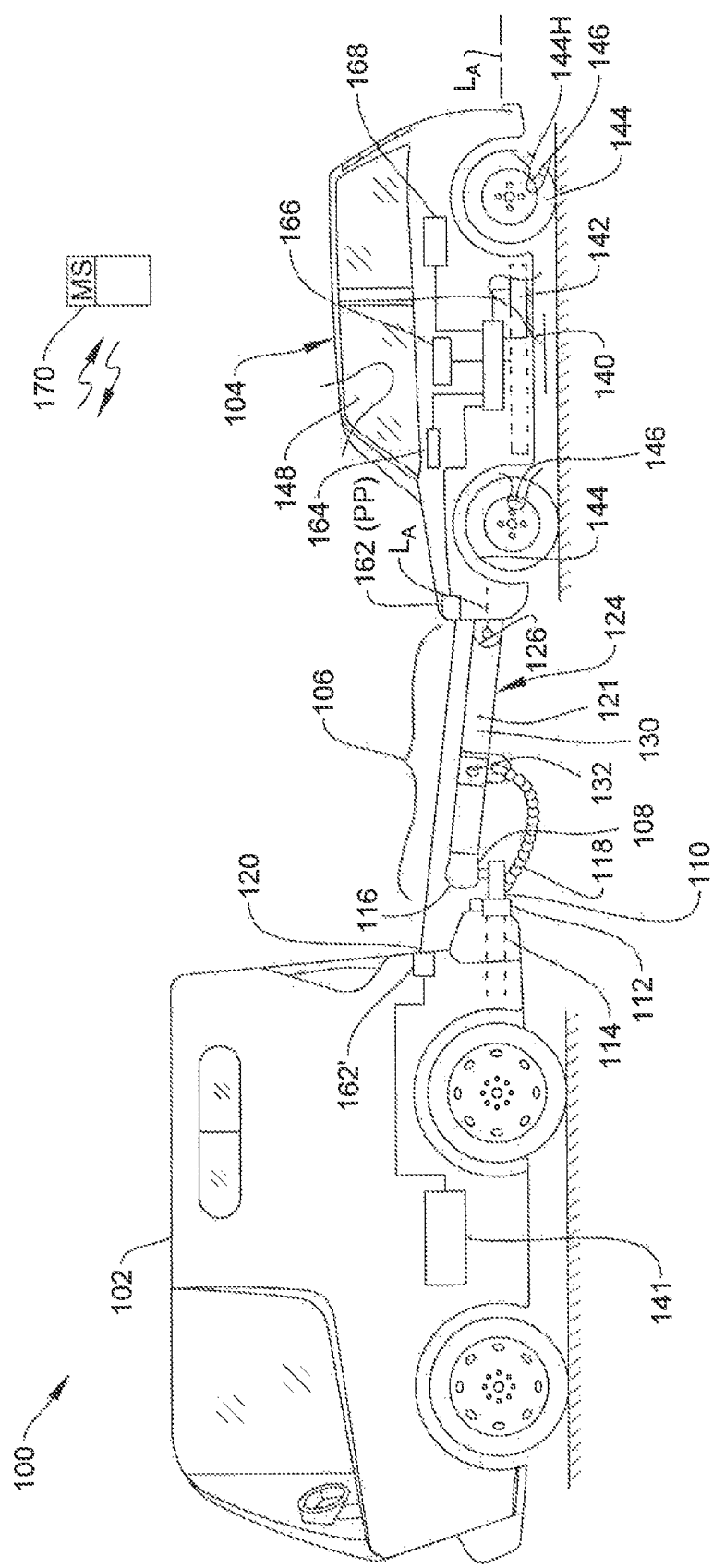
FIG. 1 shows a partially-cutaway side view of an articulated vehicle system (AVS) in accordance with embodiments of the present system.

FIG. 1 shows a partially-cutaway side view of an articulated vehicle system (AVS) 100 (hereinafter system 100 for the sake of clarity) in accordance with embodiments of the present system. The system 100 may include a recreational vehicle (RV) 102 which may be coupled to an accessory vehicle (AV) 104 such as an automobile via a trailer hitch assembly (THA) 106 to enable towing the AV 104 when coupled thereto. The AV 104 may include motive force to propel itself at least when uncoupled from the RV 102. In accordance with embodiments of the present system, the motive force for the AV 104 may be one or more electric motors as described further herein. Advantageously, the one or more motors are utilized for power generation for example to charge a power storage system and/or otherwise provide a power source for the AV 104 and/or for the RV 102 when the AV 104 is being towed by the RV 102.

The system 100 may include a system controller which may include a single controller (e.g., positioned within the RV 102, the RV 104 or within an accessory) or may include a plurality of controllers which may be located remotely from each other in a distributed fashion. For example, the RV 102 may include a controller 141 and the AV 104 may include a controller 140. Each of these controllers 140 and 141, may comprise a portion of the system controller and may communicate with other portions of the controller and/or external systems. Each of the controllers 140 and 141 may control the operation of at least a portion of the system 100 such as to control the generation of power while the AV 104 is being towed. It is envisioned that the controllers 140 and 141 may communicate with each other using any suitable wired and/or wireless communication methods.

The controllers 140 and 141 may include one or more processors (e.g., microprocessors, field programmable gate arrays, etc.) and/or other logic devices and may be local and/or distributed. The controllers 141, 140 may include a network interface to communicate with a network and/or bus of the system using any suitable wired, optical, and/or wireless (e.g., Wi-Fi™, Bluetooth™, etc.) communication methods, standards, protocols, etc. As described further herein, the network interface may also enable a user to interact with the system 100 such as to monitor parameters of the system 100 such as a charge rate, towing distance, etc.

A communication link 120 may include any suitable wired, optical, and/or wireless communication link or links which may establish communication for example between the controller 140 of the AV 104 and the controller 141 of the of the RV 102. For example, the communication link 120 may include any suitable wireless communication link such as high-power and/or a low-power wireless communication links such a Wi-Fi™ communication link, a Bluetooth™, Ethernet, a proprietary link, a bus, etc. The communication link 120 may include a network such as a cellular network and/or may further include a wired communication link such as any suitable analog and/or digital wired or optical communication link. The communication link 120 may further be compatible with, identify, and/or be operative with one or more communication protocols, standards, or the like. For example, the communication link 120 may include portions to establish communication using any suitable-type of communication link such as a controller area network (CAN) bus communication link and/or the like. The communication link 120 may further include ports and/or wires to receive a wired and/or optical link to the system 100. It is further envisioned that the communication link 120 may be operative using serial and/or parallel communication methods.

The communication link 120 may further include a system for transferring power between the RV 102 and the AV 104, such as a shore power cord of the RV 102 and/or the AV 104 although a separate system or link is also envisioned. The communication link 120 may be coupled to the RV 102 at power port (PP) 162' and at the AV 104 at PP 162. The PPs 162 and 162' may include a plurality of ports such as communication and/or power ports for transmitting power, such as direct current (DC) and/or alternating current (AC) between the AV 104 and positioned within the RV 102, the RV 104 or within an accessory the RV 102. The power port (PP) 162 of the AV 104 may be coupled to the controller 140 of the AV 104. The PP 162 may be situated at any location on the AV 104 such as at the front of the AV 104 and may be operative as a coupler to receive one or more inputs and/or outputs such as a shore power cord. For example, the PP 162 may be operative as a receptacle with which the shore power cord of the RV 102 may be plugged into the AV 104. The PP 162 may include a plurality of ports which may be distributed about the AV 104 as desired. For example, a port of the PP 162 may be utilized to couple a user interface to for interacting with the controller 140 such as to set a tow distance, charging rate, etc. as described further herein.

The THA 106 may include any suitable coupling system to couple the AV 104 to the RV 102 for towing. Details of a ball-type hitch are described herein for illustrative purposes though the discussion of the THA 106 should be understood to similarly apply to other coupling systems. For example, other types of coupling methods may be suitably applied, such as pintle-hook hitch, D-ring hitch, and/or combinations thereof. However, in yet other embodiments other types of hitches are also envisioned. For example, with regard to a ball-type hitch, the THA 106 may include a tow ball 108, a shank or ball mount 110, a hitch receiver 112, a tow bar assembly (TBA) 124, a hitch coupler 116, a tow bar 121, and secondary supports such as one or more chains 118. The hitch receiver 112 may be coupled to a frame 114 of the RV 102 and may be configured to receive the ball mount 110 to which the tow ball 108 may be coupled.

The TBA 124 may include the hitch coupler 116. More particularly, the hitch coupler 116 may be situated at an end of the TBA 124 and may include any suitable coupler such as a ball socket configured to removably receive the tow ball 108 and a hitch lock may be included to lock the tow ball 108 to the hitch coupler 116 with desired degrees of travel or range of motion relative to the tow ball 108 when locked. The hitch lock may include any suitable hitch lock which may be configured to lock unto or otherwise couple to the tow ball 108 or the like. Further, it is envisioned that the tow ball 108 may be substituted with a hook-like coupler, a D-ring, coupler and/or the like.

While any system for coupling the RV 102 to the AV 104 may be suitably employed when it is desired that the RV 102 tow the AV 104, a foldable TBA 124 may be employed which facilitates storage of the TBA 124 when it is not in use for towing. In accordance with embodiments of the present system, the TBA 124 may be stored in a folded position up against the AV 104 when the AV 104 is decoupled from the RV 102, such as when the AV 104 is used for transportation. Further, the TBA 124 may be folded out into an open position such as when the AV 104 is coupled to the RV 102 for towing.

For example, the TBA 124 may include an A-arm type tow bar assembly comprising first and second extension bars 130, which may be similar to each other and having first and second ends. A vehicle coupler 126 may couple a corresponding extension bar 130 of the first and second extension bars 130 of the AV 104 and may permit the TBA 124 to rotate about an axis ($B_{ROT}$) that may be transverse or substantially transverse (e.g., plus or minus five degrees) relative to a longitudinal axis (La) of the AV 104. In this way, the TBA 124 may be folded up against the AV 104 for storage when not in use. A rotational joint 132 may be situated between the vehicle coupler 126 and the coupler 116 each of which may be coupled to the first and second extension bars 130 to shorten the frame of the A-arm type tow bar and facilitate storing the TBA 124 against the AV 104 when not in use. Further discussion of the TBA 124 in accordance with embodiments of the present system is provided herein for example with regard to FIGS. 3-6.

The RV 102 includes a tractive power source such as a diesel engine, a gasoline engine, and/or the like. The RV 102 may also include one or more electric motors such as a hybrid gasoline-electric drive system to provide tractive power to assist the tractive power source of the RV 102. The RV 102 may also include a secondary engine which may power a power generator of the RV 102. This power generator may provide power to the RV 102 to power systems such as air conditioning systems, ventilation systems, cooking systems, entertainment systems, etc., when desired such as when the AV 104 is not coupled to the RV 102 or is otherwise not being utilized for providing power to the RV 102.

The AV 104 may be any suitable accessory vehicle, such as an electric vehicle, which may be towed by the RV 102 in accordance with embodiments of the present system. For example, the AV 104 may be an automobile such as a high or low-speed electric propulsion automobile having an electric power source such as a battery pack 142 including one or more battery cells and a tractive power source such as at least one traction motor 146 for propulsion of the AV 104 when being driven. While the AV 104 may for example utilize a gasoline or diesel engine for propulsion, in accordance with embodiments of the present system, it is advantageous to utilize a traction motor for propulsion of the AV 104. In contrast to a gasoline or diesel engine, the traction motor besides providing propulsion for the AV 104, also may provide regenerative power when the AV 104 is being towed. The regenerative power may be utilized to charge a power source of the AV 104 such as a battery pack of the AV 104 and/or to provide power to the RV 102 without the need of a separate generator. Further discussions herein will focus on the use and advantages of an AV 104 utilizing one or more traction motors for propulsion.

Advantageously, the AV 104 may be a low-speed electric vehicle (LEV) also called a neighborhood electric vehicle (NEV). In operation, the RV 102 towing the AV 104 is utilized to drive to a given (remote) location for example at highway speeds. Subsequently, the AV 104 is detached from the RV 102 and is then utilized for local travel around the given location. By utilizing an LEV as the EV 104, the stress on the RV 102 when towing is greatly reduced since typically, its weight is significantly less than that of a regular automobile. Further, the LEV having electric propulsion enables the generation of power when the LEV is being towed as described herein. In this way, even in a case wherein outside power is not available for charging the LEV between usage, the LEV may be assured of being charged after being towed.

The AV 104 may be supported and/or ride upon a plurality of wheel and tire assemblies 144 including a wheel hub 144H, each positioned within a corresponding wheel well. At least one traction motor 146 may be coupled to one or more wheel and tire assemblies 144 to provide rotational force, for example when the AV 104 is separated from the RV 102 and the AV 104 is being driven. The at least one traction motor 146 may be utilized to rotate the one or more wheel and tire assemblies 144 associated therewith when the AV 104 is being driven to propel the AV 104 under the control of a controller of the system such as the controller 140.

While any coupling between the traction motor 146 and the wheel and tire assembly 144 may be utilized such as a drive shaft and differential, each of these components provides for mechanical losses and complexities which may be avoided through the use of a traction motor that is directly coupled to drive the wheels of the AV 104. For example, the at least one traction motor 146 may be situated within the hub 144H (i.e., in hub motor) of the corresponding wheel and tire assembly 144 so that the wheel is directly driven by the motor. An in hub motor also reduces the weight of the AV 104 making it more desirable for towing by eliminating additional driving components and related weight such as the drive shaft and differential.

When an in hub motor is utilized to drive the wheels directly, it is preferred that at least two traction motors 146 be utilized, one on each of left and right sides of the AV 104. When two traction motors 146 are utilized, the individual motors may be placed within corresponding hubs of the left and right rear (e.g., rear wheel drive) or front (e.g., front wheel drive) wheel and tire assemblies 144. In a further embodiment, four traction motors 146 may be utilized so that each of the left and right rear and front tire assemblies 144 receives a corresponding one of the four traction motors 146 (e.g., all-wheel drive).

The at least one traction motor 146 may be formed from any suitable type of motor such as a permanent magnet motor or DC separately excited field type motor. Both of these motor types provide the ability to act as a motor to move the AV 104 when being powered by a power source and to act as generators providing electrical power during towing of the AV 104 and/or when being operated during regenerative braking to slow the AV 104 when braking is desired. For example, the at least one traction motor 146 may act as a generator under the control of the controller 140 when spun by the tire and wheel assembly 144 such as may occur when towing the AV 104. Further, the at least one traction motor 146 when rotated by the one or more wheel and tire assemblies 144 associated therewith, may perform a braking operation and generate electrical power when performing regenerative braking under the control of a controller of the system such as the controller 140 and/or the controller 141. Other motor types that have an ability to provide motive force when powered and generate power when spun, such as by the wheel and tire assemblies 144, may also be utilized as the at least one traction motor 146.

During operation, one or more controllers of the system may select to drive the at least one traction motor 146 synchronously or independently of the other during a drive or power mode and to brake the wheel and tire assemblies 144 using a corresponding at least one traction motor 146 during a regenerative mode. Thus, it is further envisioned that the at least one traction motor 146 may be controlled (e.g., during a drive mode) to provide a motive force to drive the wheel and tire assemblies 144 during a drive or power mode. During towing of the AV 104, it is envisioned that the at least one motor 146 may generate power (e.g., electrical power) without slowing the system 100. Further, the at least one traction motor 146 may be controlled to generate regenerative power (electrical power) during a regenerative mode to absorb kinetic energy from a corresponding wheel and tire assemblies 144 to slow the AV 104 when braking is desired whether being towed or driven.

When two of more traction motors 146 are provided, then the controller of the system may control each of the one or more traction motors 146 synchronously or independently of the other as may be desired. Accordingly, one of more traction motors 146 may be controlled to provide a motive force while one or more other traction motors may be controlled to a provide regenerative power, etc. Further, it should be understood that the controller of the system may control each of the one or more traction motors 146 dependently or independently of each other as may be desired such that power output and/or regenerative braking forces on each of the one or more traction motors 146 may be the same as or different from other ones of the one or more traction motors 146. However, for the sake of clarity only a single traction motor such as the at least one traction motor 146 will be discussed unless the context indicates otherwise.

By using direct drive (e.g., an in hub motor), disadvantages of transmission drive systems during towing may be avoided. For example, it is known that automatic transmissions internals may overheat, fail, and/or experience increased wear when towing over a threshold distance (e.g., 30 miles) at relatively low speed (e.g., 50 mph). These problems are exacerbated at higher speed such as may be experienced when a towed vehicle is towed on highways. Accordingly, these disadvantages and others may be avoided in using a direct drive motor as the propulsion system for the AV 104.

The at least one traction motor 146 may include an electronic hub-mounted traction motor or motors situated on a hub of one or more corresponding wheels 146 of the AV 104. The AV 104 may include a plurality of wheels such as two, three, four, or more wheels. However, for the sake of clarity, the AV 104 may include any suitable four-wheeled vehicle such as a four-wheel low-speed automobile as illustrated. The AV 104 may include open or closed-style vehicles and may include a passenger compartment 148 having seating and/or safety systems (e.g., seatbelts) for one or more passengers.

The AV 104 may further include an inverter and rectifier (I/R) 166, a port 164, and the power port (PP) 162. The IR 166 includes an inverter for converting a DC source such as the battery 142, to an alternating current (AC) source. For example, the battery 142 may provide DC power to the inverter of the IR 166 which converts the DC (e.g., conditions the received power) to produce an AC power source. For example, the AC power from the inverter may be supplied to the RV 102 through the PP 162. The IR 166 includes a rectifier for converting AC power from an AC source, such as the PP 162 when connected to main power or from the at least one traction motor 146, to DC power, such as to charge the battery 142. The rectifier may also be utilized for generating DC from AC power generated by the at least one traction motor 146 when the AV 104 is being towed and/or during regenerative braking. Power from the IR 166 (either AC or DC) may also be provided to a charge of the system and/or to a battery management controller of the system (e.g., see FIG. 7 and related discussion) as required depending on whether these systems require AC or DC power for operation. In accordance with embodiments, the rectifier and current limiting circuit (e.g., IR 166, controller 140, etc.) may control the power delivery from the at least one traction motor 146 to the battery based on information received from a battery management system such as the battery management controller as further described herein. Further, the charger of the system may operate independent of the IR 166 and/or the battery management system for charging the battery 142 when the AV 104 is plugged into line/mains voltage.

In accordance with embodiments of the present system, the IR 166 may be utilized for controlling a charge rate of the battery 142 with or without use of a separate battery charger through controlled rectification and/or boosting of the generated power from the at least one traction motor 146 during regenerative power generation. Further, when using a separately excited DC motor as the at least one traction motor 146, changes in the field coil current/voltage may be utilized for controlling a charge rate of the battery 142. For example, a reduction in the field current results in a reduction of the voltage generated during a constant rotational speed of the separately excited DC motor. Further, an increase in the field current results in an increase of the voltage generated during a constant rotational speed of the separately excited DC motor. This control of the generated power from the at least one traction motor 146 when producing regenerative power may be utilized together with or without the battery charger to adjust (increase, decrease) a charge rate of the battery 142, under control of the controller 140.

Accordingly, the I/R 166 may be utilized to condition power for use by the system 100. For example, the I/R 166 may receive a power source of the system, such as from a charging cord set via the PP 162. The received power may be sensed and analyzed by a controller of the system such as the controller 140 which may determine how to condition the received power. For example, if it is determined that AC power is received at the PP 162 (e.g., from a charging cord set), the controller 140 may control the I/R 166 to convert the AC power to DC at a desired current and/or voltage suitable to charge the battery pack 142 without use of a separate battery charger. In accordance with embodiments, the battery charger of the system may operate independent of the controller 140, the IR 166 and/or the battery management system, for charging the battery 142 for example when the AV 104 is plugged into line/mains voltage via the PP 162. However, if it is determined that the DC power is received at the PP 162 (e.g., from a charging cord set), the controller 140 may control the I/R 166 to upconvert and/or down convert the DC power to DC at a desired current and/or voltage, for example, suitable to charge the battery pack 142, for providing power to the at least one traction motor 146, for providing power to the port 164, etc.

Similarly, the I/R 166 may receive direct current (DC) (from any suitable power source of the system such as the battery pack 142, a DC mains obtained via the PP 162, etc., and may convert the DC to AC having desired voltage and/or frequency (e.g., 50, 60, etc. Hz) under the control of a controller of the system such as the controller 140. An output of the I/R 166 may be provided to a bus of the AV 104 for use by the system 100 such as for charging the battery pack 142, for running the AV 104, for use by the RV 102, and/or for any other purpose (e.g., for powering a TV coupled to the RV 102, etc.)

The battery pack 142 of the AV 104 may include any suitable electrical power source such as one or more battery cells (e.g., lead-acid, lithium, cadmium, etc.), capacitors (e.g., supercapacitors), fuel cells, etc. The PP 162 may include any suitable communication and/or power port for providing power from/to the AV 104 and/or the RV 102. The PP 162 may be configured to receive mains power (e.g., AC or DC power or power from a charging cord set) to charge the battery pack 142. Further, the PP 162 may provide a port configured to couple to a shore power cord or the like which may provide power to the RV 102 when the RV 102 draws power from the AV 104. Accordingly, the PP 162 may include a plurality of inputs and may be configured to determine a type of input being received (e.g., AC, DC, etc.).

The AV 104 may include a device shelf and USB charging receptacle (e.g., the port 164 which may be wired or wireless) which may be situated at a center of a dashboard of the AV 104 and which may be configured to provide for coupling to a mobile station (MS) 170 such as a tablet or phone (e.g., a smart phone such as an I-Phone™ or the like). The port 164 may include any suitable type port for communicating with the system 100 and/or proving power to and/or receiving power from the system 100 such as a USB-type port, a wireless port, etc. In accordance with the present system, the port 164 may be utilized for receiving a device such as the MS 170 so that the device may operate as a user interface for interacting with the system 100. For example, the MS 170 when coupled to the port 164 may be configured to function as an instrument panel of the AV 104 and render instrumentation information of the AV 104 such as one or more of speed, charge (e.g. battery charge, current draw, voltage, etc.), mileage (e.g., odometer, trip meter, etc.), time, radio stations, heating ventilation and air conditioning (HVAC) settings, turn signals, other parameters and/or settings of the AV 104, etc. Further, the MS 170 may receive inputs of the user and act accordingly. Accordingly, the MS 170 may be configured as an instrumentation display and/or input device of the AV 104.

When the AV 104 is being towed by the RV 102, the MS 170 may be wirelessly coupled to the port 164 and may be situated within the RV 102. In this way, the MS 170 may be configured to render information related to the system 100 such as a battery bank state of charge of the battery pack 142, temperature of the battery pack 142 or portions thereof, etc. Further, the MS 170 may receive inputs from a user and may be configured to control power draw to/from the battery pack 142 such as for controlling charging of the battery pack 142 (e.g., during towing of the AV 104), etc. Accordingly, the MS 170 may communicate with the system using any suitable wired and/or wireless communication method and/or standard.

The system 100 may include IOS™ and/or Android™ applications to provide for communication with the MS 170 and/or to provide a user interface (UI) (e.g., on a display of the system such as a display of the MS). Through use of these applications, a user such as a driver of the RV 102 and/or AV 104, may interact to monitor parameters and/or settings of the AV 104 (e.g., speed, temperature of the battery, temperature of the motors, actual charge or discharge rate, actual battery voltage, set charge rate, etc.) and/or may control one more features and/or functions (e.g., charge rate, etc.) of the AV 104.

The system 100 may further include a brake controller 168. The brake controller 168 may be located at any suitable location such as at the RV 102, the THA 106, and/or the AV 104 which is illustratively shown. The brake controller 168 may include an interface with which a user may interact to adjust settings of the brake controller 168 and at least one sensor which may sense an input such as deceleration, acceleration, brake inputs, etc. of the system 100 and may form corresponding braking sensor information (which may also be referred to as a braking signal), and provide this information as a braking signal to a controller of the system such one or more of the controllers 141 and/or 140. The controller of the system may receive the braking signal and analyze it to determine whether to control the at least one traction motor 146 to apply a regenerative braking force and/or to control (mechanical) brakes of the AV 104. The controller of the system may modulate braking and/or regenerative power in accordance with the braking signal.

For example, if in response to the braking signal it is determined by the controller 140 to apply regenerative braking of the AV 102, such as in a case wherein regenerative braking is determined to be sufficient to produce a desired braking force, the controller 140 may be operative to control the at least one traction motor 146 to apply regenerative braking. Similarly, if in response to the braking signal it is determined to apply the brakes of the AV 102, such as in a case wherein regenerative braking is determined to be insufficient to produce a desired braking force, the controller may be operative to apply the brakes of the AV 102 alone or together with applying regenerative braking to produce the desired braking force. Accordingly, the brakes and/or the regenerative braking may be applied independently or together as needed.

The controller 140 of the system may determine how much braking force is required using any suitable method. For example, the brake controller 168 may include any suitable trailer brake controller such as a pendulum or rate-type trailer brake controller which may indicate an amount of braking force that is being applied by the RV 102 so that the controller 140 may selectively activate regenerative braking features and/or mechanical braking systems of the AV 104.

The controller 140 may receive a braking signal from an accelerometer (e.g., as the brake controller 168) and compare the braking signal with one or more brake threshold values to determine whether to selectively activate regenerative braking features and/or mechanical braking systems of the AV 104. In a pendulum type brake controller, a braking signal indicating a degree of acceleration/deceleration is produced based on a degree and direction of swing of a pendulum from a straight down position. With the pendulum type brake controller, a degree of acceleration is determined from the angle that the pendulum points away from the RV 102 and a degree of deceleration is determined from the angle that the pendulum points towards the RV 102.

As an example, the braking signal may indicate an amount of desired braking on a scale of zero to ten, with zero indicating no braking and ten indicating a maximum desired braking. In this scenario, the system may be set so that any braking signal from one to five, is utilized by the controller 140 to control an amount of braking generated through regenerative braking with five being the maximum braking that may be generated by the regenerative braking system. Braking signals from six to ten may be utilized by the controller 140 to maintain a maximum regenerative braking together with increasingly applying the mechanical brakes as the braking signal increases from six (e.g., maximum regenerative braking and minimum mechanical braking) to ten (e.g., maximum regenerative braking and maximum mechanical braking). Naturally, the desired result is to produce the amount of braking that is indicated as required by the braking signal so that the amount of braking resulting from either of the regenerative braking system and the mechanical brakes may be set differently than the simplified example provided above. For example, the processor 140 may be set so that mechanical braking occurs prior to the regenerative braking being at a maximum and/or more or less braking force may be applied by either braking systems in response to the braking signal.

The controller 140 using a signal from the brake controller may then control the at least one traction motor 146 of the AV 104 to provide a regenerative braking force and/or activate mechanical brakes of the AV 104 to safely assist the RV 102 (towing the AV 104) in decelerating and/or stopping both of the RV 102 and the towed AV 104. The brake controller may further determine whether to apply regenerative braking and/or to apply mechanical brakes of the AV 104 in accordance with system and/or user settings which may be obtained from a memory of the system and/or may be determined from the braking signal which for example may be indicative of how much force is being applied to a braking pedal. For example, in a case wherein the braking signal indicates more deceleration is desired than is available from regenerative braking, mechanical braking may also be applied in addition to or in place of the regenerative braking. In this way, the AV 104 may assist the RV 102 when decelerating, for example by biasing upon the permanent magnet motor rectification or by increasing/decreasing the separately excited DC motor's field. Further, to assist with regenerative braking, a resister may be switched across motor leads to provide a load to effectuate braking. The switching of the resister may be modulated according to the amount of braking force required as for example may be indicated by the braking signal. For example, by increasing/decreasing the separately excited DC motor's field, the induced back electromotive force (back EMF) from the field inductor of the may be correspondingly increased/decreased thereby increasing/decreasing the braking force during regenerative braking. This may effectively add dynamic braking using a typical brake controller and assists the RV 102 in stopping while the AV 104 is coupled to the RV 102. In this way, the present system may replace conventional brake operator units that may be used with a conventional towed vehicle to provide such stopping assistance. Further, since the brake controller input may share the control of the permanent magnet motors rectification or the DC separately excited motor's field control, charging and braking work simultaneously.

Figure 2:
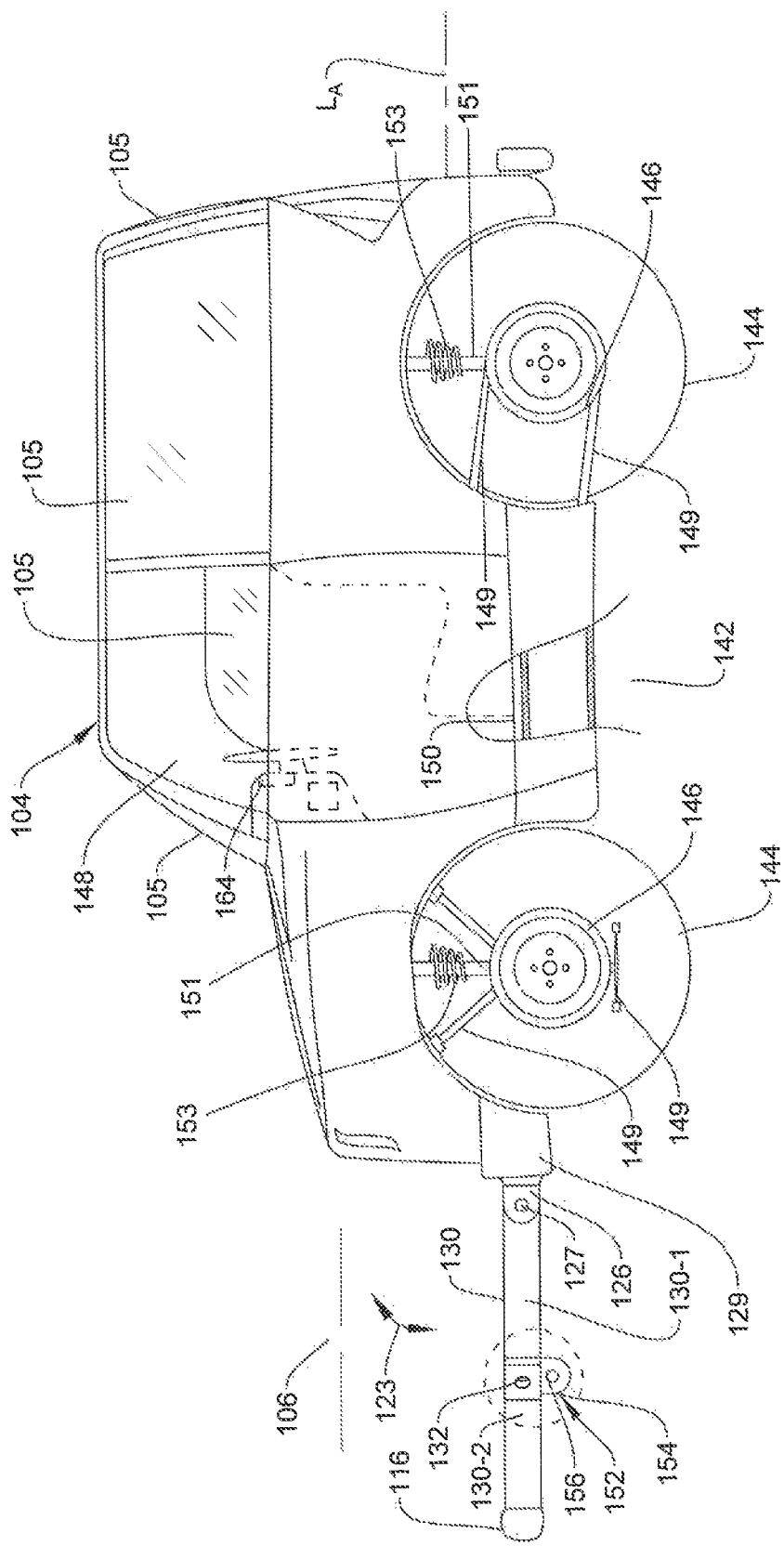
FIG. 2 shows a partially-cutaway side view of a portion of accessory vehicle (AV) with a portion of a trailer hitch assembly (THA) attached and the tire and wheel assemblies on one side removed in accordance with embodiments of the present system.

FIG. 2 shows a partially-cutaway side view of a portion of the AV 104 with a portion of the THA 106 attached and the tire and wheel assemblies on one side removed to reveal each of the at least one traction motor(s) 146 in accordance with embodiments of the present system. The AV 104 is shown with the at least one traction motor 146 in each wheel hub of the plurality of tire and wheel assemblies 144 of the AV 104. However, in yet other embodiments it is envisioned that a single one of the at least one traction motor 146 may be provided in selected wheel hubs 144H of the plurality of tire and wheel assemblies 144 of the AV 104. As discussed, the tire and wheel assemblies 144 may be coupled directly to the one or more traction motors 146 associated therewith or may be coupled via a driveshaft, gear set, a transmission, a chain or belt drive, etc., and/or any other intervening member or members.

The AV 104 may include windows 105 (one of which is shown in an open position to reveal the passenger compartment 148. A battery pack 142 may be situated in any suitable location aboard the AV 104 such as under a floor pan 150 of the AV 104. One or more suspension arms 149 may be provided to control the position and/or orientation of the tire and wheel assemblies 144 relative to a chassis of the AV 104.

One or more of the suspension arms 149 may be rigid or may be spring-like as may be desired. For example, one or more of the suspension arms 149 may include transverse or longitudinal leaf springs as may be desired. Dampeners 151 may be provided to dampen motion of corresponding wheel and tire assemblies 144 and may be passive or may be actively controlled by a controller of the system. The AV 104 may be suspended using one or more springs 153 situated at each of the tire and wheel assemblies 144. It is envisioned that one or more of the springs 153 may be passive or actively controlled by a controller of the system. The springs 153 may include springs of any suitable type such as leaf, coil, torsion, air (e.g., pneumatic, etc.), oil and/or combinations thereof.

As shown and previously described, each of the vehicle couplers 126 may be coupled to a corresponding extension bar 130 and to one or more support members 129 of the AV 104 such as a bumper, a chassis cross brace, or the like (e.g., a chassis cross member, a towing hitch mount, etc.). Each of vehicle couplers 126 may include at least one joint to provide a desired degree of travel and/or range of motion to the support arm 130 attached thereto about at least one axis such as about the axis of rotation $B_{ROT}$ which is substantially transverse to the longitudinal axis (LA) of the AV 104.

Each of the vehicle couplers 126 may be provided with a pin 127 about which the corresponding support arms 130 (or portions thereof) may rotate as illustrated by arrow 123. Accordingly, the pin 127 may be operative as a hinge pin to couple vehicle couplers 126 to corresponding support arms 130. The support arms 130 may include first and second portions 130-1 and 130-2, that may be rotationally coupled to each other by the rotational joint 132. More particularly, the rotational joint 132 may be configured to provide for the rotation of the first and second portions 130-1 and 130-2 relative to each other about an axis of rotation $A_{ROT}$ of the rotational joint 132. The axis of rotation $A_{ROT}$ is parallel to the axis of rotation $B_{ROT}$ and is also substantially transverse to the longitudinal axis (LA) of the AV 104.

A rotational lock 152 may be configured to rotationally lock the first and second portions 130-1 and 130-2 relative to each other so as to prevent rotation of the first and second portions 130-1 and 130-2 relative to each other. The rotational lock 152 may include a plurality of flanges 154 each having an opening through which a pin or the like (e.g., a rod, a bolt, etc.) may be situated when in the locked position as described in more detail below.

Figure 3:
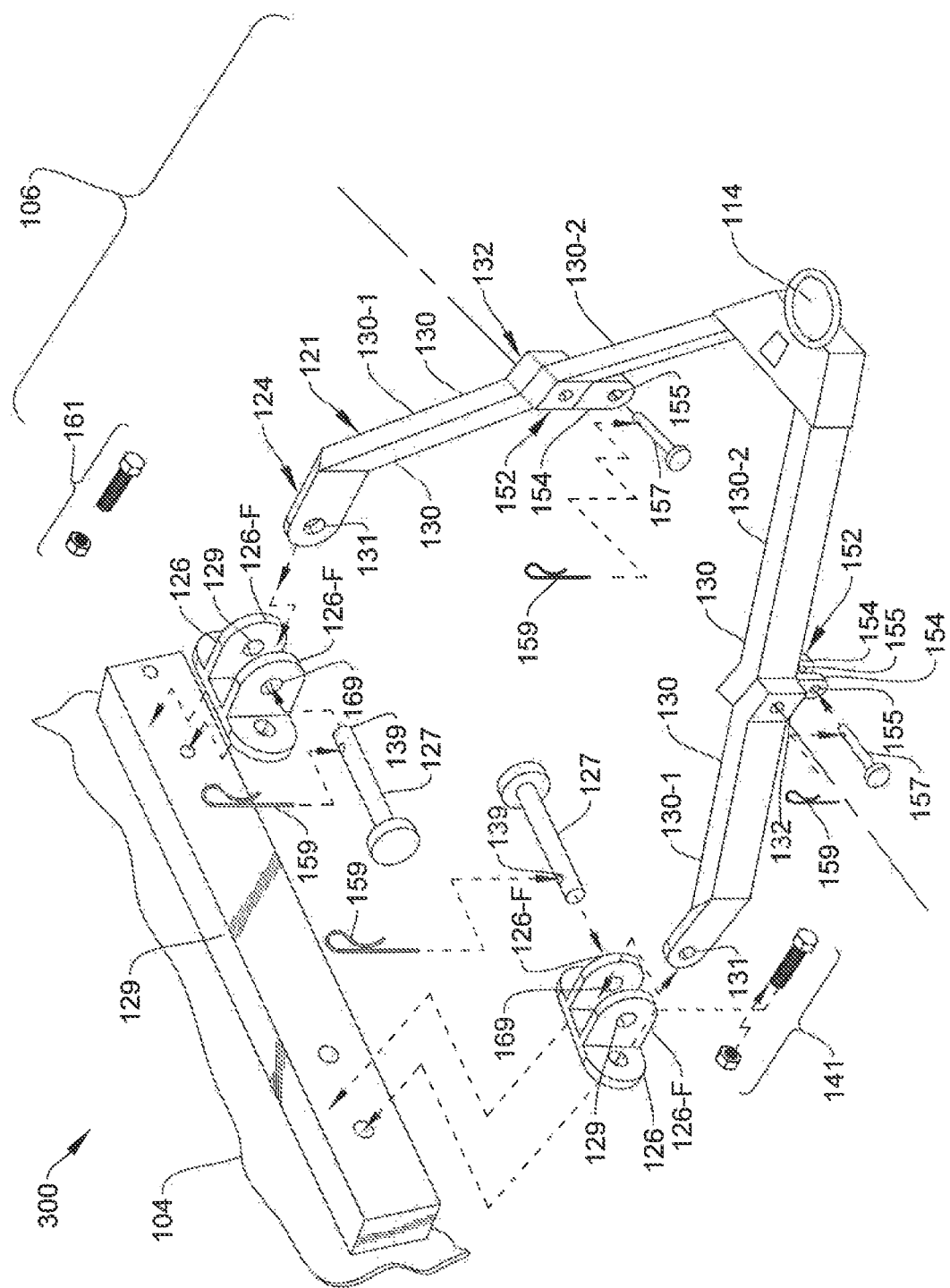
FIG. 3 shows an exploded perspective view of a portion of an AV with a THA as may be attached thereto in accordance with embodiments of the present system.

FIG. 3 shows an exploded perspective view 300 of a portion of the AV 104 with the THA 106 as may be attached thereto in accordance with embodiments of the present system. For attaching the AV 104 to the THA 106, pins 127 may be inserted into and extend through corresponding openings 169 of the vehicle coupler 126 and openings 131 of the support arm 130. To ensure the positioning of the pins 127 through the openings 169, 131 is maintained, the pins 127 may be locked in place by any suitable lock such as locking pins 158 (e.g., cotter pin, R-clip, etc.) which may extend through corresponding opening 139 of the pins 127. It is envisioned that other suitable locking methods such as bolts, rivets, rods, etc. may also be used as the pins 127.

The vehicle couplers 126 may include one or more flanges such as flanges 126-F that may be spaced apart from each other to receive an end of the corresponding support arms 130. The vehicle couplers 126 may be coupled to the one or more support members 129 of the AV 104 using any suitable method such as bolt and nut assemblies 161 or the like. However, it is also envisioned that other suitable methods for attaching the vehicle couplers 126 to the one or more support members 129 such as welding, rivets, pins, etc. may be employed. However, in yet other embodiments, it is envisioned that the vehicle couplers 126 may be formed integrally with the one or more support members 129 of the AV 104. Regardless of the attachment method, when the flanges 126 are coupled the to the first and second extension bars 130, the combination may form a hinge having the axis of rotation $B_{ROT}$ which may extend through the openings 131 in the first and second extension bars 130. The axis of rotation $B_{ROT}$ enables the TBA 124 to rotate, relative to the vehicle couplers 126, and swing upward against the AV 104 for storing the TBA 124 as further described herein.

The TBA 124 may, when extended, form a A-arm type tow bar assembly comprising the first and second extension bars 130 (generally extension bars 130) with an apex at the vehicle coupler 116. With regard to the vehicle coupler 116, it may be fixedly or rotatably coupled to the first and extension bars 130 as may be desired.

With regard to the rotational locks 152, each of the flanges 154 may include an opening 155 and may be located relative to the corresponding first and second portions 130-1 and 130-2 of the corresponding first and second extension bars 130 such that the openings 155 of adjacent flanges may be aligned when the tow bar assembly 124 is extended. To lock the TBA 124 into an extended position, a pin 157 may extend though the openings 155 of adjacent flanges 154 to prevent rotation of the rotational locks 152 and, thus, prevent rotation of the first and second portions 130-1 and 130-2 relative to each other. A locking pin 159 may be similar to the locking pin 158 and may extend through an opening of each of the locking pins 159 to hold the pins 157 in place relative to the flanges 154 through which the pins 157 extend. It is envisioned that the pin 157 may be easily removed from the openings 155 of adjacent flanges 154 through which it extends to permit rotation of the rotational locks 152 and, thus, permit rotation of the corresponding first and second portions 130-1 and 130-2 of the extension bars 130 relative to each other. It is envisioned that the rotational locks 152 may be aligned so that the rotational joints 132 respective axis of rotation $A_{ROT}$ are aligned with each other. The axis of rotation $A_{ROT}$ enables the corresponding first and second portions 130-1 and 130-2 to rotate relative to each other to enable shortening an extension of the TBA 124 as further described herein.

FIG. 4 shows a top view of a portion of the TBA 124 in an extended position in accordance with embodiments of the present system. As shown, the extended position of the TBA 124 is utilized when the TBA 124 is utilized for towing the AV 104. Illustratively, the tow bar assembly 124 may form an "A" like shape when extended such as for towing.

FIG. 5 shows a top view of a portion of the TBA 124 in a folded (shortened) position in accordance with embodiments of the present system. When transitioning from the extended position shown in FIG. 4 to the folded position shown in FIG. 5, the first and second portions 130-1 and 130-2 are rotated 180° relative to each other about the axis of rotation $A_{ROT}$. Illustratively, the TBA 124 is shown forming an "M" or "W" like shape when in the folded position such as when the TBA 124 is folded for storing.

FIG. 6 shows a side view of a portion of the TBA 124 offset from a folded storing position in accordance with embodiments of the present system. To facilitate storing of the TBA 124 against the AV 104, the AV 104 may include flanges 160 which may be similar to the flanges 154 and includes openings therethrough. The flanges 160 are positioned on a front end of the AV 104 to be adjacent to corresponding ones of the flanges 154 when the TBA 124 is in the folded storing position.

In FIG. 6, the TBA 124 is shown slightly offset from a (fully) folded storing position to facilitate separate visualization of the flange 160 relative to the flange 154. When the TBA 124 is in the folded storing position by rotating the first and second extension bars 130 towards the AV 104, the openings that extend through corresponding ones of the flanges 154 (e.g., the flanges 154 closest to the AV 104) and the flanges 160 are aligned. For example, once the TBA 124 is folded as shown in FIG. 5, the TBA 124 may be rotated about the axis of rotation $B_{ROT}$ so that the TBA 124 is positioned adjacent to the front end of the AV 104. Once the openings that extend through corresponding ones of the flanges 154 and the flanges 160 are aligned, each of the flanges 160 are positioned and configured to be coupled to an adjacent one of the flanges 154 for example using a pin similar to pin 157 to lock the folded TBA 124 in the folded storing position relative to the AV 104. For example, a pin (e.g., similar to, or the same as pin 157) may be inserted through the openings of adjacent flanges 154 and 160 that are aligned such that the pin may extend through the aligned openings to couple the corresponding ones of the flanges 154 and 160 to each other so as to hold the folded TBA 124 in the folded storing position relative to the AV 104. In this way, the flanges 154 may be configured to lock the tow bar assembly 124 in the folded storing position and to lock the tow bar assembly 124 in the extended position such as when towing the AV 104.

Figure 7:
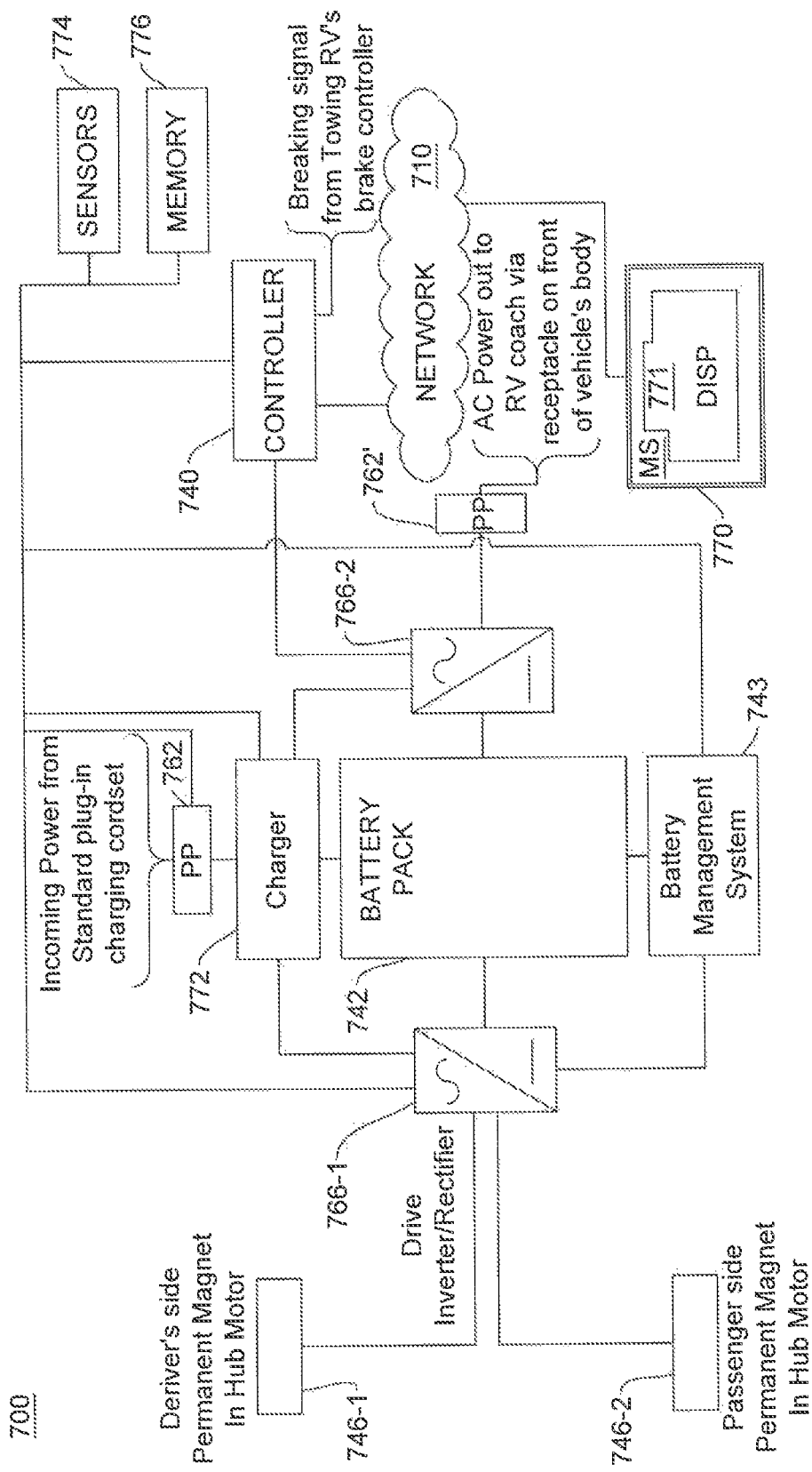
FIG. 7 shows a schematic view of a portion of an AVS in accordance with embodiments of the present system.

FIG. 7 shows a schematic view of a portion of an articulated vehicle system (AVS) 700 (hereinafter system 700 for the sake of clarity) in accordance with embodiments of the present system. The system 700 may be provided as a portion of the AV 104 and may include a controller 740, a memory 776, one or more sensors 774, a charger 772, a network 710, a mobile station (MS) 770, a battery management system 743, a battery pack 742, a charger 772, a drive inverter/rectifier (I/R$_D$) 766-1, an output inverter/rectifier (I/R$_O$) 766-2 (generally IRs 766), as well as a first and second traction motors 746-1 and 746-2 (generally motors 746-x). While two traction motors are illustratively shown in FIG. 7, the present system may operate with one or more traction motors (e.g., 1, 2, 3, 4 or more).

The controller 740 may control the overall system 700 and as such, may communicate with and/or control one or more of the memory 776, the sensors 774, the charger 772, the network 710, the MS 770, the battery management system 743, the battery pack 742, the I/R$_D$ 766-1, the I/R$_O$ 766-2, the traction motors 746-x and/or a brake controller (such as the brake controller 168). As discussed, the charger 772 may also operate independent of the I/RD 766-1 and/or the battery management system 743 for charging the battery 142 for example when plugged into line/mains voltage.

The controller 740 may be similar to the controller 140 as described with reference to FIG. 1 and may include one or more processors (e.g., microprocessors, logic devices, etc.) and may be local and/or distributed relative to each other when more than one processor is utilized. The controller 740 may further include a network interface to communicate with the network 710 and/or bus of the system using any suitable wired, optical, and/or wireless (e.g., Wi-Fi™, Bluetooth™, etc.) communication methods, standards, and/or protocols. For example, the controller 740 may include bidirectional Bluetooth™ radio connectivity for communicating with the MS 770.

The network 710 may include any suitable network or communication bus over which one or more portions of the system 700 may communicate. The network 710 may employ wired, wireless, and/or optical communication methods, networks, etc. For example, the network 710 may include a Bluetooth™ network, a Wi-Fi™ network, a telephony network, and/or the like.

The sensors 774 may sense one or more operating parameters of the system such as parameters of the AV 104 including one or more of battery temperature (battery pack, battery bank, battery cell, etc.), battery coolant temperature, battery charge level, battery charge and/or discharge rates, coolant temperature, wheel bearing temperature(s), HVAC settings, ambient temperature, inside temperature, brake temperature, bearing temperature, EV travel speed, temperature and/or load of the motors 746-x, speed of the motors 746-x, etc., and form corresponding sensor information. One or more of the sensors 774 may be included as a portion of the battery changer 772 and/or may be included as a portion of the battery management system 743. The sensor information from the one or more corresponding sensors 774 may then be provided to the controller 740 for further processing. For example, the controller 740 may utilize the sensor information for determining adjustments to system settings. Further, it is envisioned that the parameter information may be output on a user interface (UI) of the system, such as a display 771 of the MS 770, for the convenience of the user and/or to enable the user to adjust one or more system settings, such as a charge rate of the battery 742.

The memory 776 may include any suitable memory in which information generated by the system such as operating parameters received from the one or more sensors 774, charge/discharge rate, etc., may be stored, as well as user settings, system settings, vehicle settings, programming instructions for configuring the controller 740 to operate as described, and/or the like. The memory 776 may include any non-volatile memory and may be local and/or distributed (e.g., a surface area network (SAN) type memory or the like). For example, the controller 740 may generate information related to a trip and/or charging/discharging and may interact with the memory 776 to store this information and/or may later retrieve the stored information.

The battery pack 742 may be local or distributed and may include one or more battery banks each of which may include one or more cells or batteries such as lithium-ion type cells and/or other suitable battery cells. The charger 772 may include any suitable charging system for charging the battery pack 742 independent of or under the control of the controller 740 and in accordance with one or more user and/or system settings. For example, a user may determine a trip distance (TD) (e.g., 200 miles) for a current trip which is a predetermined distance that the RV (e.g., 102) is to tow the AV (e.g., 104) over a route of the trip. The TD may be mapped by the system (e.g., the controller 740) and/or a user and may have a corresponding travel route. In this way, knowing a current charge that is present on the battery pack 742 (e.g., a charge in percent, such as 50%) before embarking on the trip and knowing the charge capacity (e.g. CAP=100 kWh) of the battery pack 742, the system 700 (e.g., the controller 740) may determine a desired charge rate (CR) for the battery pack 742 over the predetermined distance (e.g., over the route) such that the battery pack may be evenly charged over the course of the route. For example, knowing that the battery is 50% charged and it is rated at 100 kWh, the controller 740 may determine that the battery pack requires 50 kWh of charge to be fully charged. Then, knowing that the trip is 200 miles, the controller 740 may divide this value by the trip distance to determine the desired charge in kWh divided by the predetermined distance. In this example, the desired charge rate would be 50 kWh/200 miles=0.25 kWh/mile. Accordingly, the system may set the charge rate equal to this value for the current trip.

The battery charger 772 may monitor a condition of the battery pack 742 to determine a current charge of the battery pack 772. Knowing the charge and an expected towing distance, the controller 740 and/or the battery management system 743 may determine a desired rate of charge of the battery pack 742. Thereafter, through the charger 772 and/or the I/R$_D$ 766-1, the controller 740 may control charging of the battery pack 742 such that the battery pack 772 is properly charged while the EV 104 is being towed. When powering with a permanent motor, the amount of rectification may be controlled using a processor in order to control the charging. In embodiments using a separately excited motor, a particular field (e.g., having a given field strength) may be applied to change the battery charging accordingly.

The battery management system 743 may monitor a charge/discharge rate, temperature, voltage, etc., of the battery pack 742 or portions thereof such as one or more of individual cells, batteries, and/or banks of the battery pack 742. For example, while the EV 104 is being towed, the battery management system 743 may monitor the battery pack 742 and may determine that the battery pack 742 is charging faster or slower than desired. The battery management system 743 may provide the measured charge rate to the controller 740 so that the charge rate of the battery pack 742 may be suitably adjusted (e.g., increased or decreased) to provide a fully charged battery pack 742 by the time a towing destination is reached. For example, while a desired charge rate may be calculated in advance (e.g., 0.25 kWh/mile), an actual charge rate during towing may be determined which may vary from the desired charge rate, for example due to towing conditions such as traffic, regenerative breaking, battery usage during towing, etc. In this way, the actual charge rate of the battery pack 742 may be more or less than the desired charge rate. In these cases, the controller 740 may increase or decrease the charge rate through suitable control of the I/R 766-1 and/or the charger 772 to provide a fully charged battery at the end of the trip.

When receiving power from mains power (e.g., via a charging cord set coupled to the PP), the charger 772 may, independent of or under the control of the controller 740, determine to charge the battery pack 742 partially or fully depending upon system and/or user settings. As used herein, it should be understood that mains power may refer to power received from one or more sources such as conventional mains, an external generator, other batteries or storage devices, solar cells, wind turbines, water turbines, and/or the like. A charging cord set may provide the mains power to a port of the system such as the port PP 762 which, in turn, may provide the mains power to the charger 772. Thus, for example, the charger 772 may receive power from one or more sources of power such as from mains power, a conventional electric-car charging station, RV park power, standard 110V/220 outlet, and/or the like and may charge the battery pack 742 together with or independent from the battery management system 743, the I/R$_D$ 766-1, etc., using this received power. Accordingly, one or more PPs of the system such as the PP 762 may be configured to couple to the one or more power sources using corresponding ports. For example, the PP 762 may include a port for coupling to an AC main power, a DC fast charge port, an EVSE, a fast charger (e.g., a level 3, level 4, etc.), a level 2 charger, etc.

More particularly, the charger 772 may condition (e.g., by converting AC power to DC power) the incoming power to a desired voltage, current, and/or waveform (e.g., 48V, 20A, DC) and provide the conditioned power to the battery pack 742 for charging one or more of the batteries of the battery pack 742. The charger 772 may also provide conditioned power to other portions of the system 700. In accordance with embodiments, the charger may be independent of or operate as a portion of the I/R 766-x since both are capable of conditioning incoming power, whether from the PP 762 or from the motors 746-x. For example, the rectifier and current limiting circuit (e.g., the I/R 766-x) may control the power delivery from the one or more of the motors 746-x to the battery pack 742 based on information received from the battery management system 743. Further, the charger 772 may operate independent of the I/R 766-x and/or the battery management system 743 for charging the battery pack 742, for example when the AV is plugged into line/mains voltage such as through the PP 762.

When in the regenerative mode, one or more of the motors 746-x may generate power and provide this power to the I/R$_D$ 766-1. The I/R$_D$ 766-1 may condition this generated power (e.g., by converting the incoming power to a desired voltage and/or current, e.g., 72V, 20A, DC) and provide the conditioned power to the battery pack 742 (directly) and/or may provide the conditioned power to the charger 772 for charging one or more of the batteries of the battery pack 742. As appreciated, in accordance with embodiments the charger 772 may not be required for charging the battery pack 742, for example when in regenerative mode as the I/RD 766-1 may provide the conditioned power to the battery pack 742 directly, for example under control of the battery management system 743.

In accordance with embodiments of the present system, the regenerative mode may be continuous, although the power produced may vary, as the AV 104 is being towed whether or not regenerative braking is occurring. Accordingly, embodiments of the present system may capture energy from one or more of the motors 746-x substantially (e.g., mostly) during the entire period while the AV 104 is being towed by the RV 104. In this way, the regenerative mode is due to regenerative braking, which may be used to assist braking, and also is due to regenerative charging which may occur during periods of towing when regenerative braking is not being applied (e.g., during steady-state highway cruising, etc.).

The battery pack 742 may be utilized for powering the system 700 as desired. Further, when power from the battery pack 742 is desired for providing power to an external device (e.g., RV 102), the battery pack 742 may provide a power signal to the I/R$_O$-766-2 which may then condition this power signal to conform to a desired output type (e.g., AC, DC), voltage and/or waveform. The I/R$_O$-766-2 may provide the conditioned power signal as an output power source such as at a PP 762'.

The MS 770 may include any suitable mobile station such as a smart phone (e.g., an Android™ phone, an I-Phone™, etc.), a tablet computer (e.g., a I-Pad™, etc.), laptop and/or the like. The MS 770 may communicate via any suitable wired and/or wireless connection with the system 700 such as via a Bluetooth™ connection via network 710, and/or via a wired connection such as via a USB port of the system 700 which may be coupled to the controller 740. An application may be provided to configure the MS 770 to communicate with the controller 740. This application may further be configured to output a user interface (UI) with which a user may interact with the system. Accordingly, the UI may display information generated by the system 700 and may receive a user input (e.g., via a user input device such as a touchscreen, a keyboard, a mouse, a trackball, a stylus, etc.) to adjust one or more settings of the system 700, such as charging rate.

It should be appreciated that by relying upon battery power of the AV to power the RV when parked, embodiments of the present system may reduce or entirely eliminate the need for having/using a generator. Accordingly, problems such as fuel, emissions, noise, and maintenance associated with using the generator to power the RV, may be eliminated.

Figure 8:
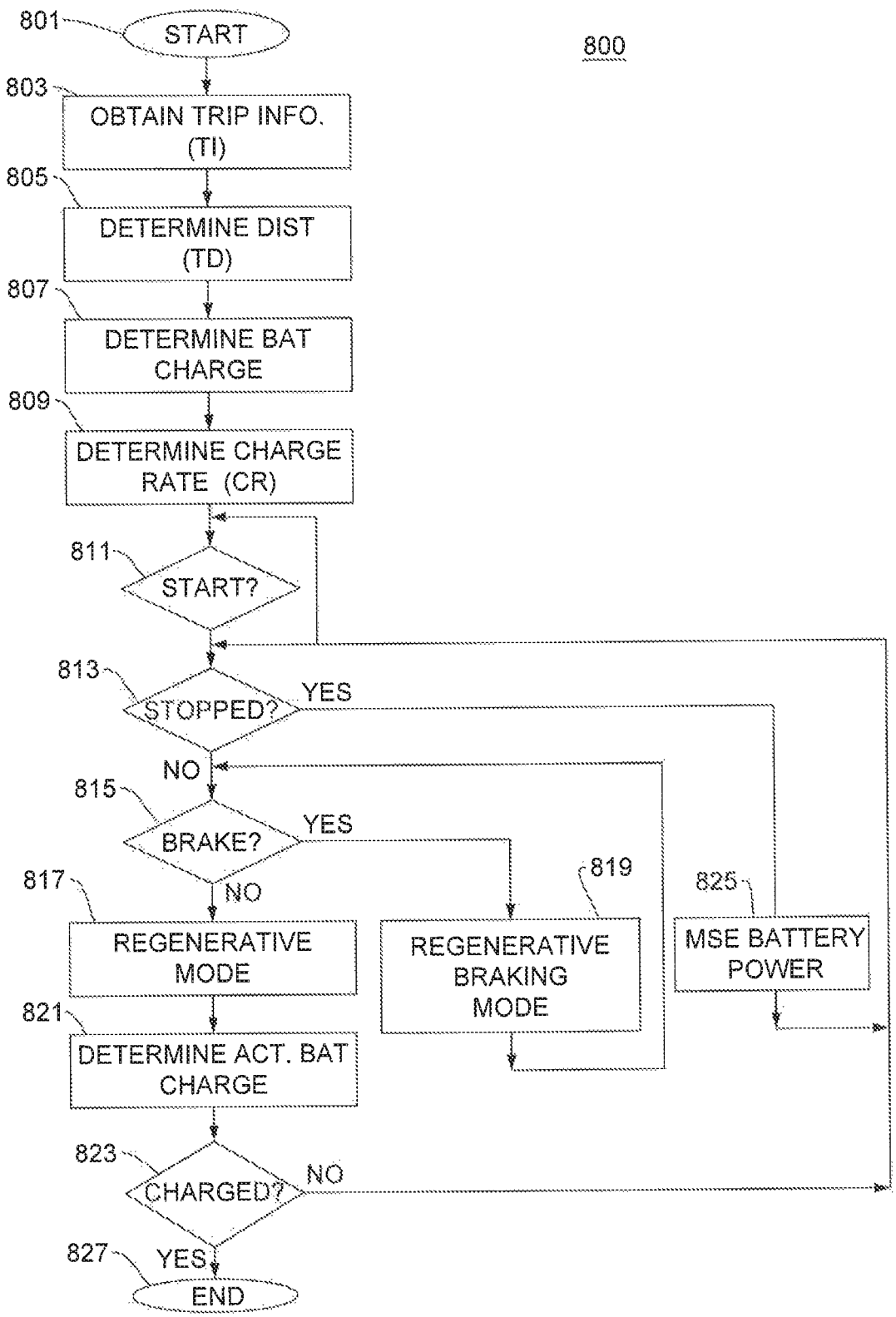
FIG. 8 shows a functional flow diagram performed by a portion of a process in accordance with embodiments of the present system.
Figure 9:
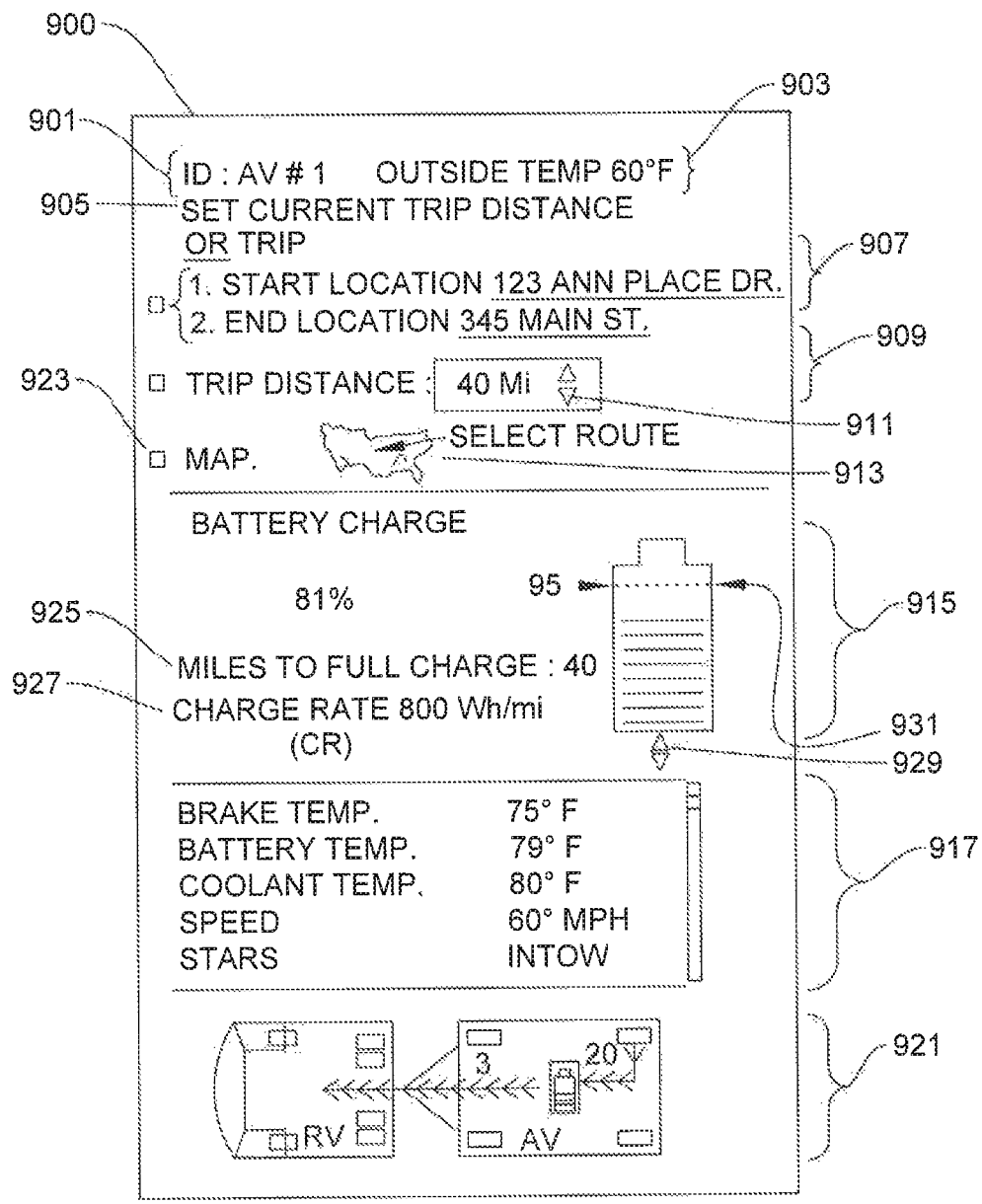
FIG. 9 shows a screenshot of a portion of a screen generated by a mobile station (MS) of the system in accordance with embodiments of the present system.

FIG. 8 shows a functional flow diagram performed by a portion of a process 800 in accordance with embodiments of the present system and FIG. 9 shows a screenshot 900 of a portion of a screen and related user interface (UI) generated by an MS of the system in accordance with embodiments of the present system. Referring to FIG. 8, the process 800 may be performed using one or more processors, computers, controllers, etc., communicating over a network and/or a bus of the system and may obtain information from, and/or store information to, one or more memories which may be local and/or remote from each other. The process 800 may include one of more of the following acts. Further, one or more of these acts may be combined and/or separated into sub-acts, as desired. Further, one or more of these acts may be skipped depending upon settings. In operation, the process may start during act 801 and then proceed to act 803. The process may control an RV and/or an AV and/or provide communication between these two vehicles. Further, one or more of the acts may be combined or split into sub-acts.

During act 803, the process may obtain trip information (TI) for a current trip. The TI may include information related to start, stop, and end information which may be referred to as start (e.g., a trip start location), stop (e.g. rest stop location(s), etc.) and end (e.g., a trip end) locations, respectively. For example, with regard to a start location, this location may correspond with a current location of one or more of an RV, an AV, and/or an MS of the system as may be set by the system and/or user. It is further envisioned that the system may obtain (e.g., via a GPS locator or the user) a geophysical location and/or an address (e.g., 123 Anyplace Dr., USA) information and may use this information to determine start, stop, and/or end locations. In the following examples an address such as a street address may be shown and discussed for the sake of clarity. However, when a street address is entered or otherwise obtained by the system, the system may convert the street address to a geophysical location and/or vice versa.

For the sake of clarity, it will also be assumed that the location of the RV, the AV, and/or the MS may be assumed to be the same. Accordingly, the system may determine the location of the MS using any suitable location method such as employing a location method using global positioning system (GPS) information and/or a triangulation system. Accordingly, the system may include a locator such as a triangulator (e.g., mobile-phone-based locator, etc.), a GPS system, etc. which may determine a current location of the MS, RV, and/or AV as may be set by the system and/or the user.

In accordance with embodiments of the present system, to determine the start and/or end locations, the system may request this information directly from a user of the system. Accordingly, the system may generate and/or render on a UI of the system, such as a UI of the MS, a prompt requesting the user to enter a starting address (e.g., 123 Anyplace Dr., USA) or location. However, it is envisioned that the system may determine a starting address or location based upon a current location or address of the MS. It is envisioned that the system may determine a start location using a user selection on a map rendered by the system on a UI of the system. For example, the system may render a map on a UI of the system and a user may select one or more locations on this map such as a start location (address) and/or an end location (or address) and/or a route.

It will be assumed that the user may enter an end location similarly to the method used to enter the start location (e.g., by direct address entry such as 345 Main St. USA as shown in a start and stop information selection items 907 of FIG. 9). More particularly, the start and stop information entry area 907 may be populated by information input by a user directly or through another method such by direct conversion of map information (e.g., indicative of the start and stop locations). However, other methods of populating the start and end locations may also be employed such as extracting start and stop location information from an electronic message (e.g., an email, etc.) or webpage received by the MS and selected by the user.

After completing act 803, the system may continue to act 805 where it may determine a distance of the trip which may be referred to as trip distance (TD) and which may be a predetermined distance. The system may determine the TD using one of several methods such as a direct input (e.g., 40 miles) as shown in a TD display area 909. However, a user may edit the TD using any suitable entry method such as by using selection items 911 to adjust the TD or from analysis of start and end location information and/or selected route information. For example, the system may determine the TD based upon route information (e.g., determined using a mapping program of the system or a third-party mapping program such as Google Maps™ or the like) which may determine a route corresponding to the start and stop locations so as to link the start and end locations. The system may determine route information for one or more routes which may link the start and end locations. The system may provide for a user to select one or more of these routes and/or a default route (e.g., shortest distance) may be selected such as a least distance route.

Referring to FIG. 9, a map selection item 923 or a map representation 913 may be selected by the user to render a map. Accordingly, when it is determined that the user has selected the map selection item 923 or the map representation 913, the system may render a map corresponding to a predetermined location such as a current location of the MS or a location selected by the user. The system may render the route information as well as the start, stop, and end location information on the rendered map. Then, the user may select one of the routes corresponding with the route information. However, in yet other embodiments, it is envisioned that the user may select a route based upon criteria such as shortest distance, etc.

Once the route is selected or otherwise determined, the system may determine TD in accordance with the selected route and/or may display this information in a TD display area (e.g., 909 of FIG. 9). A user may then adjust the determined TD directly or by using arrows 911.

It is envisioned that the user may enter the TD directly in which case the system may set the TD according to the user's entry. Accordingly, the system may generate and render a distance selection area (e.g., see, 909 of FIG. 9) in which a user may enter or adjust a trip distance directly (e.g., using arrows 911). After completing act 805, the system may continue to act 807.

During act 807, the system may determine battery charge (e.g., in kilowatt hour (kWh) or % of full charge or a charge range (e.g., 20-80% to increase battery life), etc., as may be selected by the system and/or user) of the battery pack (or a portion thereof) of the AV. The battery charge may be represented in any suitable unit such as kWh. For example, knowing that the battery pack is rated at 100 kWh (e.g., rated capacity (RC) and that it is currently 60% charged (e.g., current capacity (CC)), then the system may calculate RC−(RC*CC)=100 kWh−(100 kWh*0.60)=40 kWh. This may be referred to as a desired trip charge (TC) and may correspond to an amount of charge that the battery pack is to be charged over the mileage of the current trip. The system may employ tables stored in a memory of the system to lookup the TC in kWh and/or other units.

It is also envisioned that the system may determine battery charge using any suitable method or methods as may be known in the art. After completing act 807, the system may continue to act 809. During act 809, the system may determine a desired charge rate (CR) (e.g., in any suitable unit such as watt hours/mile (Wh/mi) or the like) in accordance with the determined battery charge or value of TC and the determined TD. For example, the system may determine CR by dividing the TC by the trip distance (TD), e.g., TC/TD, to obtain the charge rate (per unit such as a mile) for the current trip.

For example, assuming that the TC as set forth above is 40 kWh and TD is 40 miles then 40 kWh/40 mi=1 kWh/mi=1000 Wh/mi. The determined CR may be referred to as a desired charge rate for the current trip. Once the system determines the CR, it may determine charge rate settings (CRS) for the determined charge rate (CR).

The CRS may set forth settings and/or parameters to obtain the desired charge rate and may be used to control various portions of the system such as a charger of the system and/or $IR_D$ of the system. The CRS settings may be stored in a memory of the system (e.g., as a lookup table) with corresponding desired charge rate settings and/or settings may be interpolated for the determined charge rate. The system may provide an interface with which a user may interact view, modify, and/or select the desired charge rate. For example, the system may then control the charger and/or one or more IRs of the system, such as the drive IR, in accordance with the CRS signal such that a desired amount of regenerative power may be obtained while the AV is being towed.

For example, with reference to FIG. 9, the system may render information generated by the system such as the current TD (e.g., see 909), the miles to full charge (e.g., see, 925), and/or the determined CR (e.g., see 927) for the current trip. The user may modify any of these settings (e.g., the current trip distance, the miles to full charge, and/or the determined charge rate) using any suitable method such as arrows 929, 911, etc., or using a direct entry using an input device such as through a virtual keyboard rendered on the UI, etc.

It is envisioned that the system may update information in real time. Accordingly, when one of the current trip distance, the miles to full charge, and/or the determined charge rate is modified by the user, the system may update the other related variables of the current trip distance, the miles to full charge, and/or the determined charge rate and render the updated values in real time on a UI of the system. Thus, for example, if the user updates the charge rate to 400 Wh/mi, then the system may determine that the miles to full charge is 80 miles and the trip distance may be 40 miles. However, if the user updates the charge rate to 1600 Wh/mi, then the system may determine that the miles to full charge is 20 miles. However, the trip distance may remain at 40 miles. The system may determine expected battery charge at the end of the current trip using the determined or updated current trip distance, the miles to full charge, and/or the determined charge rate. Thus, for example, if the expected battery charge at the end of the current trip is determined to be 95%, the system may render this information on a user interface of the system (e.g., see, arrows 931) which may be updated in real time. With regard to the trip distance, this distance may reflect a distance that the AV is to travel under tow by the RV. After completing act 809, the process may continue to act 811.

During act 811, the process may determine whether the current trip has started. Accordingly, if it is determined that the current trip has started, the process may continue to act 813. However, if it is determined that the current trip has not started, the process may repeat act 811. It may be determined that the current trip has started when the user selects to start the current trip such as by selecting a start key which may be a hard or soft key and may be rendered on a UI of the system. However, it is also envisioned that the system may determine to start the current trip when it is determined that the MS is moving at a speed that is greater than a threshold speed (e.g., 5 miles/hour, etc.) as may be set by the system and/or the user. Accordingly, when it is determined that the MS is moving at a speed that is greater than or equal to the threshold speed, the process may determine to start the current trip. However, if it is determined that the MS is not moving at a speed that is greater than the threshold speed, the process may determine that the current trip has not yet started.

Once the trip is determined to have started, during act 813 the system may determine whether the MS (and, thus, the AV) is stopped including whether the trip destination has been reached. Accordingly, if the MS is determined to be stopped or otherwise has reached the trip destination, the system may continue to act 825. However, if it is determined that the MS has not reached the trip destination, the system may continue to act 815.

During act 825, the system may use power from the battery pack of the AV to power the AV or provide electrical power to the RV via a shore line which couples the RV to the AV. During this act, the system may control an output IR to obtain battery power from the battery pack of the AV, convert this power to a desired waveform, frequency, and/or voltage, for usage by the AV during driving or output this converted signal to the RV via the shore line. After completing act 825, the system may repeat act 813 such as when the MS has not reached the trip destination. For the sake of clarity, it will be assumed that the operating system of the RV and/or AV may consume a negligible amount of power.

During act 815, the system may determine whether the RV is braking. The system may determine whether the RV is braking based upon a brake switch sensor signal (e.g., which may indicate when the brakes of the RV are applied) or an input signal from a brake controller (e.g., a brake signal) which may indicate whether the brakes are being applied. Accordingly, a controller of the system may obtain the brake switch sensor signal and/or the brake signal and analyze one or more of these signals to determine whether the RV is braking. When it is determined that the RV is braking, the system may continue to act 819. However, when it is determined that the RV is not braking, the system may continue to act 817.

During act 817, the system may be operative to perform a regenerative mode in which the system may control the at least one traction motor of the AV to generate regenerative power to charge the battery pack of the AV in accordance with the CR information. Accordingly, the system may control the charger of the AV, the drive I/R and/or the at least one traction motors to generate regenerative power to charge the battery pack of the AV in accordance with the desired CR information. This charging may be considered to be a steady-state charging over the distance of the current trip (e.g., the TD). If the AV has a plurality of traction motors, it may be assumed that each of these motors may be equally controlled to contribute an equal amount of power to generate the regenerative power to charge the battery pack. After completing act 817, the system may continue to act 821.

During act 819, the system may be operative to perform a regenerative mode in which the system may control the at least one traction motor of the AV to generate regenerative braking power in accordance with a braking signal (e.g., from the brake controller) and/or system settings. This regenerative braking power may be the same as, less than, or greater than, the regenerative power generated during act 817 and may vary based upon the braking signal. Thus, the braking system may remain balanced when the brakes of the combination RV and AV are applied and may function to slow the RV and the AV at the same rate. Moreover, the system may be compatible with an anti-lock braking system (ABS) controller which may control at least a portion of the braking signal. For example, if wheel lock is detected, the ABS controller may modify the braking force such that the locked wheel may spin normally again to regain traction.

To generate the regenerative braking force, the system may control the charger of the AV, one or more of the drive I/Rs, and/or the at least one traction motors to generate a regenerative braking force. Power produced by the at least one traction motor during this act may controllably charge the battery pack of the system. It is also envisioned that the braking controller may determine when to apply the brakes and may modify the braking signal accordingly such that mechanical brakes of the AV may be applied in accordance with the braking signal as previously discussed. After completing act 819, the system may repeat act 815.

During act 821, the system may determine an actual charge of the battery pack of the AV. While act 821 is shown following act 817, the system may monitor a change status of the battery pack to determine an actual charge of the battery pack of the AV at any time including continuously. In a case wherein it is determined that the battery is charging faster or slower than the desired charging rate, the charging rate may be adjusted during act 821 to ensure that the desired capacity threshold of charge on the battery is reached at the end of the trip.

After completing act 821, the system may continue to act 823. During act 823, the system may determine whether the battery pack of the AV is charged. Accordingly, if it is determined that the battery pack of the AV is charged, the system may continue to act 827 where the process may end. However, if it is determined that the battery pack of the AV is not charged, the system may repeat act 813. The system may determine whether the battery pack of the AV is charged by comparing the actual charge of the battery pack with a capacity threshold of the battery pack such as a rated capacity of the battery pack. The capacity threshold may correspond with the actual rated capacity of the battery pack (e.g., 100 kWh, etc.) or may correspond with a selected value such as 80% of the actual capacity (e.g., 100 kWh*0.80). This may assure that the battery pack may be charged within a safe range of its capacity to conserve life of the battery pack. The capacity threshold may be set by the system and/or the user.

Referring back to FIG. 9, the system may obtain parameter information of the system such as parameters of the AV and may render this information in a parameter area 917. The parameters may include temperatures (e.g., brake temperature, wheel bearing temperature, battery pack temperature, etc.), speed, battery pack charge rate, current charge %, etc. Identification area 901 may provide an identification of the AV. Area 903 may provide temperature information such as outside temperature information.

The system may generate a graphic representation 921 of the RV and the AV in which battery flow (e.g., current flow) may be rendered in real time to illustrate current flow in the system (e.g., from the motors to the battery pack of the AV and/or to the RV) as may be illustrated by arrows, bars, etc. A graphic representation of each of the wheels may be rendered and may indicate a status of a corresponding wheel, tire, and bearing assembly. For example, green may indicate normal bearing and brake temperatures and/or normal tire pressure while red may indicate excessive bearing temperature, brake temperature and/or low tire pressure. When a parameter is abnormal (e.g., low or excessive as may be determined by a controller of the system), the abnormal parameter may be rendered adjacent to the graphic representation of the corresponding wheel and/or tire assembly.

Figure 10:
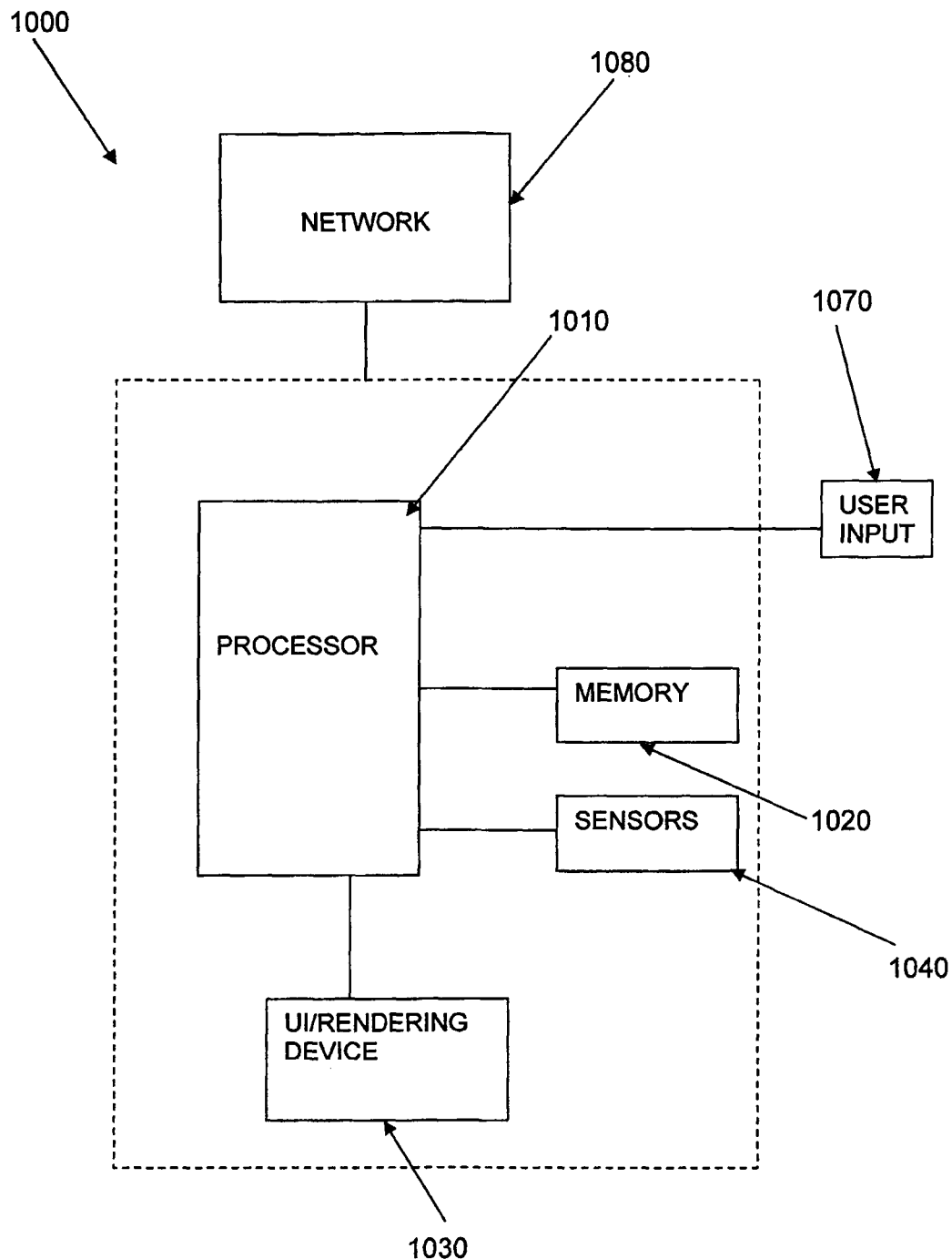
FIG. 10 shows a portion of a system in accordance with embodiments of the present system.

FIG. 10 shows a portion of a system 1000 in accordance with embodiments of the present system. For example, a portion of the present system may include a processor 1010 (e.g., a controller such as the controller 140, 740) operationally coupled to a memory 1020, a user interface (UI) including a rendering device such as a display 1030, sensors 1040, and a user input device 1070. The memory 1020 may be any type of device for storing application data as well as other data related to the described operation. The application data and other data are received by the processor 1010 for configuring (e.g., programming) the processor 1010 to perform operation acts in accordance with the present system. The processor 1010 so configured becomes a special purpose machine particularly suited for performing in accordance with embodiments of the present system.

The processor 1010 may render the content such as still or video information on a UI of the system. This information may include information related to operating parameters, instructions, feedback, and/or other information related to the operation of the system or portions thereof. The sensors 1040 may include sensors of the RV, AV, and brake controller or the like and may sense related parameters, form sensor information, and provide this sensor information to the processor 1010.

The user input 1070 may include a keyboard, a mouse, a trackball, or other device, such as a touch-sensitive display, which may be stand alone or part of a system, such as part of a laptop, a personal digital assistant (PDA), a mobile phone (e.g., a smart phone), a smart watch, a smart phone, an e-reader, a monitor, a smart or dumb terminal or other device for communicating with the processor 1010 via any operable link such as a wired and/or wireless communication link. The user input device 1070 may be operable for interacting with the processor 1010 including enabling interaction within a UI as described herein. Clearly the processor 1010, the memory 1020, display 1030, and/or user input device 1070 may all or partly be a portion of a computer system or other device such as a client and/or server device.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 1020 or other memory coupled to the processor 1010.

The program and/or program portions contained in the memory 1020 may configure the processor 1010 to implement the methods, operational acts, and functions disclosed herein. The memories may be distributed, for example between the clients and/or servers, or local, and the processor 1010, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 1010. With this definition, information accessible through a network is still within the memory, for instance, because the processor 1010 may retrieve the information from the network for operation in accordance with the present system.

The processor 1010 is operable for providing control signals and/or performing operations in response to input signals from the user input device 1070 as well as in response to other devices of a network and executing instructions stored in the memory 1020. The processor 1010 may include one or more of a microprocessor, an application-specific and/or general-use integrated circuit(s), a logic device, etc. Further, the processor 1010 may be a dedicated processor for performing in accordance with the present system and/or may be a general-purpose processor wherein only one of many functions operates for performing in accordance with the present system. The processor 1010 may operate utilizing a program portion, multiple program segments, and/or may be a hardware device utilizing a dedicated or multi-purpose integrated circuit.

The processor 1010 may be operable to control a single vehicle, such as an RV, a AV, and/or the combination when articulated together such as when camping in accordance with embodiments of the present system. Similarly, the processor 1010 may be operable to control a power system, a charging system, and/or a braking system of the AV operating in accordance with embodiments of the present system.

Accordingly, embodiments of the present system may provide a system in which a towed vehicle (e.g., the AV) may be charged steadily while the towing vehicle (e.g., the RV) is traveling at speed while safely monitoring the state of charge of the batteries and allowing the towing vehicle driver input to control the charging rate and/or mode. A Bluetooth™ or Wi-Fi™ link between the rendering device 1030 (e.g., a MS) and the system may enable rendering of system parameters on a UI of the rendering device 1030 which may also provide an entry area in which a user may change parameters such as charging rate, etc. of the towed vehicle. Additionally, this link may be configured to link the towed and towing vehicles control systems using a two-way connection. With this connection, the towed vehicle's battery system parameters may be rendered and its charging rates and times may be adjusted. Parameters such as bearing temperature, voltages, charge/discharge amperage, and any related alarms from the towed vehicle may be rendered on within the UI for the convenience of the user such as a driver of the RV. Through the UI, the user (e.g., the driver of the RV) may interact to select and/or change parameters such as selecting faster rates of charge of the battery pack for shorter distances, or longer rates of charge for longer distances. It is envisioned that the towed vehicle may include a controller (e.g., the controller 140, 740) to monitor its battery pack voltage and temperature. Information may be rendered on the UI to notify the user (e.g., the driver of the RV or other towing vehicle) when the battery pack has reached a desired charge and the processor may automatically taper down charging prior to the desired charge and/or shutdown charging operations of the AV when the desired charge is reached.

Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, any section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated;

i) the term "plurality of" an element includes two or more of the claimed element, and does not imply any particular range of number of elements; that is, a plurality of elements may be as few as two elements, and may include an immeasurable number of elements; and j) the term and/or and formatives thereof should be understood to mean that only one or more of the listed elements may need to be suitably present in the system in accordance with the claims recitation and in accordance with one or more embodiments of the present system.

What is claimed is:

1. An electric vehicle, comprising:
at least one traction motor configured to provide a motive force to rotate at least one wheel of the electric vehicle to propel the electric wheeled vehicle;
at least one battery pack comprising a plurality of battery cells and configured to power the at least one traction motor; and
at least one controller circuit configured to:

determine trip distance information (TDI) corresponding to a predetermined distance to be traveled by the electric vehicle when under tow by another vehicle, determine charge amount information (CAI) for the battery pack based upon a capacity of the battery pack and a current charge of the battery pack, determine rate of charge information (RCI) to be generated by the at least one traction motor in accordance with the TDI and CAI, the RCI determining a rate of charge of the at least one battery pack over the predetermined distance, and control charging of the at least one battery pack in accordance with the RCI.

2. The electric vehicle of claim 1, wherein the at least one traction motor is situated in a hub of at least one wheel of the electric vehicle.

3. The electric vehicle of claim 1, wherein the electric vehicle further comprises a foldable tow bar assembly configured to be coupled to the other vehicle when in an open position and stored for travel by the electric vehicle independently of the other vehicle when in a folded position.

4. The electric vehicle of claim 3, wherein the foldable tow bar assembly is configured to substantially form an "A" like shape when in the open position and an "M" like shape when in the folded position.

5. The electric vehicle of claim 1, wherein the at least one controller circuit controls a charger of the electric vehicle to charge the at least one battery pack substantially equally over the predetermined distance.

6. The electric vehicle of claim 1, wherein the RCI is determined such that the battery pack is charged substantially at an equal rate by distance over the predetermined distance.

7. The electric vehicle of claim 1, wherein the at least one controller circuit is configured to control the at least one traction motor to substantially run in a regenerative mode to generate power to charge the at least one battery equally over the predetermined distance when the electric vehicle is towed by the other vehicle.

* * * * *